United States Patent Office 3,379,751
Patented Apr. 23, 1968

3,379,751
DI- AND TRICYANOCYCLOPENTADIENES
AND THEIR SALTS AND FORMALDE-
HYDE COPOLYMERS
Owen Wright Webster, Wilmington, Del., assignor to E. I.
du Pont de Nemours and Company, Wilmington Del.,
a corporation of Delaware
No Drawing. Filed May 14, 1964, Ser. No. 367,590
18 Claims. (Cl. 260—464)

ABSTRACT OF THE DISCLOSURE

Di- and tricyanocylopentadienes produced by reaction of cyclopentadiene, cyanogen halide and sodium hydride and their salts and formaldehyde copolymers are claimed. The salts form colored complexes useful in copying devices. The formaldehyde polymers are useful as ion-exchange resins.

This invention relates to a new group of organic compounds and to a method for their preparation. More particularly, this invention relates to a process for the cyanation of cyclopentadienes and to di- and tricyanocyclopentadienes, their salts and polymers which may be prepared therefrom.

The monomeric compounds of this invention can be represented by the formulas

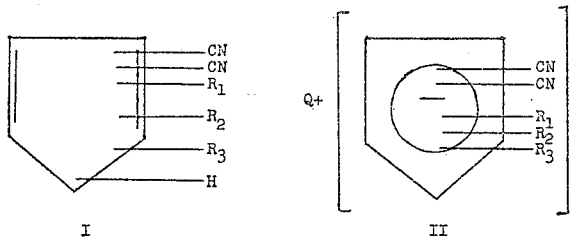

wherein $R_1$ is hydrogen, halogen of atomic number 17–35 (i.e. chlorine and bromine), nitro or cyano, $R_2$ is hydrogen, chlorine, bromine, nitro, amino, alkyl, alkoxycarbonyl or carboxy, $R_3$ is hydrogen, chlorine, bromine or nitro, and Q represents one equivalent of a cation, e.g., hydrogen ion, a metal ion, an unsubstituted ammonium ion or an alkyl-substituted ammonium ion. Each of the ring carbons of the compounds of Formula I is bonded to not more than one CN, $R_1$, $R_2$ or $R_3$ group other than hydrogen and each of the ring carbons of the compounds of Formula II is bonded to not more than one CN, $R_1$, $R_2$ or $R_3$ group.

The polymeric compounds of this invention can be characterized as containing the recurring unit of the formula

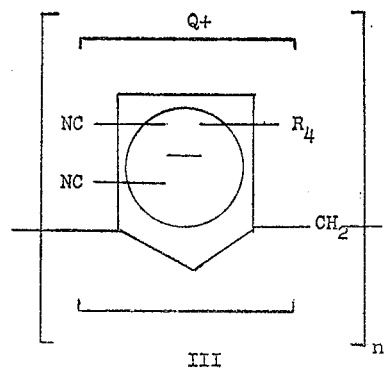

wherein Q is as defined above, $R_4$ is hydrogen, chlorine, bromine, nitro, cyano, alkyl, alkoxycarbonyl or carboxy, and $n$ is a cardinal number greater than five.

For purposes of this invention, the number of carbon atoms in alkyl, in the "alkoxy" portion of alkoxycarbonyl, and in each "alkyl" of the alkyl-substituted ammonium ions is from 1–18. Of these the preferred substituents contain 1–8 carbon atoms, i.e., "lower" alkyl, etc.

By the term "metal ion" is meant the ionic form of any metallic element, i.e., any element of atomic number 3, 4, 11–13, 19–32, 37–51, 55–84, 87–102 and above.

The process of this invention comprises reacting, in the presence of sodium hydride, a cyclopentadiene with cyanogen chloride to produce the sodium salt of a mono-, di-, or tricyanocyclopentadiene. The sodium salts cn be converted in turn to the corresponding free acids (Formula I) by treatment with an acidic ion-exchange resin. Furthermore, salts with cations other than sodium can be obtained either from the free acids just described or from the orginal sodium salts by means of conventional metathetical reactions.

Operable starting materials for the process of this invention include unsubstituted cyclopentadiene and cyclopentadienes carrying an alkyl, alkoxycarbonyl, carboxy or nitro substituent. Again, alkyl and "alkoxy" of alkoxycarbonyl contain 1–18 carbon atoms, preferably eight or fewer.

The reaction can be carried out at any temperature in the range from −80° C. to +100° C. Pressures in the range from 0.1 atmosphere to 1000 atmospheres are operable; however atmospheric pressure is preferred for reasons of convenience.

The reaction is conducted in a liquid reaction medium. Especially suitable for this purpose are aprotic solvents, e.g., ethers, tetrahydrofuran, dimethylformamide, acetonitrile, dimethoxyethane, polyethyleneglycol dimethyl ether, and nitrobenzene.

In the process of this invention, the number of cyano groups introduced onto the cyclopentadiene or substituted cyclopentadiene compound can be controlled very readily by the molar proportion of cyanogen chloride employed. Preferred molar ratios are 1 to 2 moles of sodium hydride per mole of cyanogen chloride and 2 to 4 moles of cyanogen chloride per mole of cyclopentadiene compound.

In this connection also it has been found that further reaction of a tricyano compound of Formula I or Formula II with cyanogen chloride can be carried out in the presence of aluminum chloride to obtain tetra- and pentacyanocyclopentadiene compounds such are disclosed in my copending coassigned patent application, Ser. No. 255,068, filed Jan. 30, 1963. For purposes of this reaction molar ratios of 0.1 to 1 mole of aluminum chloride per mole of cyclopentadiene or cyclopentadienide and 1 to 10 moles of cyanogen chloride per mole of cyclopentadiene or cyclopentadienide are preferred.

The reaction is carried out at temperatures in the range from −20° C. to +100° C. Pressures from 0.1 atmosphere to 1000 atmospheres are operable, but atmospheric pressure is preferred.

Operable liquid media are any non-basic aprotic solvent of the type suitable for conducting alkylations which are catalyzed by Lewis acids. Suitable for this purpose are solvents such as acetonitrile, nitrobenzene and nitromethane.

The compounds of Formulas I and II above which contain two hydrogen atoms on non-adjacent (i.e. 1,3) positions on the cyclopentadiene ring copolymerize readily with formaldehyde to form polymers of Formula III. All the compounds of Formula I and those of Formula II wherein Q is hydrogen are sufficiently acidic to react directly with formaldehyde. However, when Q is other than hydrogen, the addition of acid is required to effect copolymerization. Any acid capable of bringing the reaction mixture to a pH less than 5 is suitable, e.g., acetic acid, trifluoroacetic acid, dilute hydrochloric acid, dilute sulfuric acid and the like.

The di- and tricyanocyclopentadienes of this invention may be converted to the corresponding chloro, bromo, and nitro derivatives by the well-known reactions for introducing such groups into the benzene nucleus. (See Wagner and Zook, "Synthetic Organic Chemistry," Wiley, 1953).

The free acids of this invention, i.e., the compounds of Formula I and compounds of Formula II where Q is hydrogen, react readily in water or acetonitrile solution with the oxides and hydroxides of metals to yield the corresponding salts. Thus, they may be treated with an oxide or hydroxide of $Li^+$, $Na^+$, $Mg^{++}$, $Al^{+++}$, $K^+$, $Ca^{++}$, $Ti^{++}$, $Cr^{+++}$, $Mn^{++}$, $Fe^{++}$, $Fe^{+++}$, $Co^{++}$, $Co^{+++}$, $Ni^{++}$, $Ni^{+++}$, $Cu^{++}$, $Zn^{++}$, $Rb^+$, $Sr^{++}$, $Mo^{+++}$, $Ag^+$, $Cd^{++}$, $Sn^{++}$, $Cs^+$, $Ba^{++}$, $Hg^{++}$, $Pb^{++}$, or $Bi^{+++}$, to obtain the corresponding metal salts which are isolated by precipitation and filtration or by evaporation of solvent. The acid solutions are also readily treated with ammonium halides such as tetramethylammonium chloride, tetra(n-hexyl)amonnium iodide, dioctylammonium chloride and dioctadecylammonium chloride to obtain the corresponding ammonium salts in which the respective di- or tricyanocyclopentadienide ion replaces the halide.

The copolymers of this invention are highly insoluble in water and are useful as ion-exchange resins.

The examples which follow are intended to illustrate, but do not limit, this invention. Proportions of ingredients are expressed in parts by weight unless otherwise specified.

EXAMPLE I

Part A

To a suspension of four parts of sodium hydride-mineral oil (53.4% NaH) in 175 parts of dry 1,2-dimethoxyethane is added in small portions 5.42 parts of cyclopentadiene. Hydrogen gas (0.16 part) evolves. The reaction mixture is cooled to 0° C. and 5.18 parts of cyanogen chloride is condensed into the solution. The reaction is allowed to warm to room temperature and 11.0 parts of sodium hydride-mineral oil is added. The reaction mixture is cooled again to 0° C. and 15.53 parts of cyanogen chloride is added. The mixture is stirred for three days at room temperature, filtered, and the filtrate concentrated to dryness. The residue is dissolved in water and 15 parts of silver nitrate in 100 parts of water is added. A mixture of silver 1,2,3- and 1,2,4-tricyanocyclopentadienides (15 parts) precipitates. The mixed silver salt is recrystallized from acetonitrile-water.

Part B

The silver salt formed in Part A is converted to the potassium salt (7 parts) by treatment of an acetonitrile solution with 10 parts of potassium chloride in 30 parts of water, filtering off the precipitate of silver chloride, and concentrating the filtrate to dryness. The n-m-r spectrum in deuterium oxide shows that the potassium salt is a mixture of 1,2,4- and 1,2,3-tricyanocyclopentadienides, $\tau^{1,2,4}=3.2$ and $\tau^{1,2,3}=3.6$.

EXAMPLE II

Part A

To a suspension of 100 parts of sodium hydride-mineral oil dispersion (54.5% sodium hydride) in 437 parts of 1,2-dimethoxyethane is added 66 parts of cyclopentadiene at room temperature over the course of three hours. About 2.4 parts of hydrogen is evolved. The mixture is stirred at room temperature and 60 parts of cyanogen chloride is added over three hours. The mixture is stirred one day, filtered, and the filtrate concentrated to dryness under reduced pressure. The residue is taken up in 500 parts of water and 241 parts of 6 N sulfuric acid is added. The crude cyanocyclopentadiene which separates is taken up in ethyl acetate and purified by distillation. Considerable cyanocyclopentadiene dimer is present since a distillation flask temperature of 150–170° C. crackng temperature of the dimer (D. Peters, J. Chem. Soc. 1960, 1832), is necessary to maintain a head temperature of 49–55° C./4 mm. Cyanocyclopentadiene, 23.6 parts, is collected. A center cut is analyzed.

*Analysis.*—Calcd. for $C_6H_5N$: C, 79.1; H, 5.53; N, 15.4. Found: C, 78.9; H, 5.75; N, 15.3.

Part B

Even when the above product is quickly cooled, its n-m-r spectrum indicates that it is over 50% dimer. The undimerized portion of this distillate is converted to its potassium salt by stirring in 157 parts of acetonitrile with 20 parts of potassium carbonate for four hours. The mixture is filtered and concentrated to dryness. After washing the residue with ether, there remains about 5 parts of potassium cyanocyclopentadienide. An analytical sample, m.p. 200.5–202.5° C., is obtained by dissolving the salt in acetonitrile and precipitating with ether three times. The n-m-r spectrum in acetonitrile shows a 20 line $A_2B_2$ pattern centered at $4.18\tau$ with a separation of 31.5 cps. between the first and last peaks. An intense CH out of plane deformation band occurs at $13.50\mu$ in the infrared spectrum.

*Analysis.*—Calcd. for $C_6H_4NK$: C, 55.7; H, 3.10; N, 10.9. Found: C, 56.0; H, 3.35; N, 10.7.

EXAMPLE III

Part A

A suspension of 350 parts of sodium hydride-mineral oil (53.5% sodium hydride) in 1309 parts of 1,2-dimethoxyethane is cooled to 0° C. and 133 parts of cyclopentadiene is added over a three-hour period. About 4.4 parts of hydrogen is evolved. Cyanogen chloride, 250 parts, is then condensed into the system over an eight-hour period. An additional 8.1 parts of hydrogen evolves. An n-m-r spectrum of the reaction mixture shows that the solution contains sodium 1,2-dicyanocyclopentadienide and sodium 1,3-dicyanocyclopentadienide in 6:1 ratio. Traces of tricyano- and monocyanocyclopentadienides are also present.

Part B

Pure 1,4-dicyanocyclopentadiene is isolated by filtration of the above reaction mixture, concentrated to dryness, and chromatography of 5 parts of mixed isomer on acid alumina with ethyl acetate/ether wash. The first product to be eluted is 1,4-dicyanocyclopentadiene, 0.45 part. An analytical sample, M.P. 119–121° C., is prepared by recrystallization from benzene and then from carbon tetrachloride.

IR $\lambda_{max.}^{KBr}$ 3.22, 3.44, 4.50, 7.32, 8.80, 11.05, and $11.73\mu$

U.V. $\lambda_{max.}^{CH_3CN}$ 292 m$\mu$ ($\epsilon$ 5,160), 278 m$\mu$ ($\epsilon$ 11,730), 243 m$\mu$ ($\epsilon$ 2,830) and 226 m$\mu$ ($\epsilon$ 2,250)

p$K_A$ 2.52 n-m-r$_{TMSi\ int}^{CH_3CN}$ two triplets with chemical shifts of $2.75\tau$ and $6.32\tau$ with J=1.6 cps.

*Analysis.*—Calcd. for $C_7H_4N_2$: C, 72.4; H, 3.47; N, 24.1. Found: C, 72.1; H, 3.36; N, 23.5.

Part C

Potassium 1,3-dicyanocyclopentadienide is produced from 1,4-dicyanocyclopentadiene by stirring the latter with a suspension of potassium carbonate in acetonitrile for two hours, followed by filtration and concentration to dryness.

IR $\lambda_{max.}^{Nujol}$ 4.56, 4.58, 6.85, 7.46, 8.85, 9.01, 9.52, 10.52, 12.28, 13.76, 13.93$\mu$ n-m-r$_{TMSi\ int.}^{CH_3CN}$ two peaks, triplet at 3.43$\tau$ and doublet 3.94$\tau$ with area ratio 1:2 and J=2.1 cps Part D 1,2-dicyancyclopentadienide is isolated by dissolving the mixed isomer residue not used in the chromatography of Part B above in 300 parts of water and adding 200 parts of tetramethylammonium chloride. The crude salt which precipitates is taken up in 4008 parts of methylene chloride and the solution concentrated to dryness. The residue is dissolved in 668 parts of methylene chloride and the solution is cooled to −78° C. Tetramethylammonium 1,2-dicyanocyclopentadienide, 56 parts, crystallizes and is collected on a filter and dried. An analytical sample, M.P. 97–99° C., is prepared by recrystallization three times from methylene chloride.

IR $\lambda_{max.}^{KBr}$ 3.30, 4.57, 6.71, 6.97, 7.33, 7.76, 8.25, 8.95, 9.50, 10.55 and 14.02$\mu$ U.V. $\lambda_{max.}^{H_2O}$ 283 m$\mu$ ($\epsilon$ 14,400), 267 m$\mu$ ($\epsilon$ 13,000)

pK$_A$ of conjugate acid 1.11 n-m-r$_{TMSi\ int.}^{CH_3CN}$ two peaks, a doublet at 3.8$\tau$ and a triplet at 4.3$\tau$ with area ratio of 2:1 and J=4.0 cps

*Analysis.*—Calcd. for C$_{11}$H$_{15}$N$_3$: C, 69.8; H, 7.99; N, 22.2. Found: C, 70.9; H, 8.02; N, 21.7.

Part E

An equimolar solution of 2,3-dicyanocyclopentadiene and 1,2-dicyanocyclopentadiene is produced when tetramethylammonium 1,2-dicyanocyclopentadienide is dissolved in trifluoroacetic acid.

w-m-r$_{TMSi\ int.}^{CF_3CO_2H}$ triplet at 2.4$\tau$, J=1.5 cps.

produced by vinyl hydrogen of the 2,3-isomer, a weak strong strong weak pattern centered at 3.1$\tau$ with 22 cps. separation between the two weak peaks and 11 cps. between the two strong peaks produced by the vinyl hydrogens of the 1,2-isomer and a multiplet at 6.25$\tau$ due to the allylic hydrogens of both isomers.

EXAMPLE IV

Part A

Cyclopentadiene (26.4 parts) is added in small portions (one hour) to a suspension of 80 parts of sodium hydride-mineral oil (54.5% sodium hydride) in 873 parts of 1,2-dimethoxyethane maintained at room temperature. Hydrogen evolves. The mixture is then cooled to 0° C. and 100 parts of cyanogen chloride is slowly condensed into the system (three hours). A cold finger at −78° C. is used to trap cyanogen chloride entrained with the hydrogen which smoothly evolves. After addition of the cyanogen chloride, the reaction mixture is slowly heated to reflux (two hours) and is then cooled to room temperature. A total of about 3.15 parts of hydrogen is evolved. The reaction mixture is filtered and the filtrate concentrated to dryness. The concentration residue is dissolved in 400 parts of water and washed with toluene to remove mineral oil. The water solution is then treated with 10 parts of powdered zinc to remove colored impurities and boiled until its boiling point reaches 99° C. The resulting solution is treated with carbon black and filtered. Potassium chloride (120 parts) is dissolved in the filtrate and the precipitate which forms is collected and dried. The filtrate is put aside for Part B. The dry precipitate is extracted with acetonitrile and the extract concentrated to dryness. There remains 16 parts (22% yield) of potassium 1,2,4-tricyanocyclopentadienide. An analytical sample, M.P. 380–383° C., is prepared by recrystallization two times from water.

IR $\lambda_{max.}^{KBr}$ 3.22, 4.54, 6.18, 6.17, 6.90, 7.45, 8.53, 8.95, 10.40, 12.06, and 12.33$\mu$ U.V. $\lambda_{max.}^{CH_3CN}$ 267m$\mu$ ($\epsilon$ 5,670) and 236 m$\mu$ ($\epsilon$ 30,600)

Proton n-m-r single peak at 3.37 $\tau$ (5% solution in acetonitrile, TMSi internal standard)

*Analysis.*—Calcd. for C$_8$H$_2$N$_3$K: C, 53.7; H, 1.12; N, 23.5. Found: C, 53.6; H, 1.07; N, 23.6.

Part B

After isolation of potassium 1,2,4-tricyanocyclopentadienide the potassium chloride saturated filtrate noted in Part A is extracted with 450 parts of ethyl acetate. On concentration of the extract to dryness, there remains 36 parts (50% yield) of potassium 1,2,3-tricyanocyclopentadienide. Although dark-colored impurities are present, a comparison of the infrared absorption spectrum of this product with that of the subsequent analytical sample shows that the isolated product is substantially pure. An analytical sample, M.P. 286–287° C., is prepared by chromatography on Woelm alumina (Neutral activity I) with 1:1 ethyl acetate-ether as wash, followed by recrystallization two times from saturated potassium chloride-water. The analytical sample is separated from occluded potassium chloride by extraction with ethyl acetate.

IR $\lambda_{max.}^{KBr}$ 4.56, 6.80, 7.33, 8.31 and 13.47$\mu$

U.V. $\lambda_{max.}^{CH_3CN}$ 298 m$\mu$ ($\epsilon$ 18,250), 288 m$\mu$ ($\epsilon$ 18,600), and 220 m$\mu$ ($\epsilon$ 22,200)

Proton n-m-r single peak 3.76 $\tau$ (5% solution in acetonitrile, TMSi internal standard)

*Analysis.*—Calcd. for C$_8$H$_2$N$_3$K: C, 53.7; H, 1.12; N, 23.5. Found: C, 53.5; N, 1.16; N, 23.5.

EXAMPLE V 1,2,3 - tricyanocyclopentadiene and 1,2,4 - tricyanocyclopentadiene are produced by dissolving the corresponding potassium salts in trifluoroacetic acid. The solutions are characterized by their n-m-r spectrum. Both substances show two broad peaks, one at about 2.4$\tau$ (vinyl proton) and one at about 5.3$\tau$ (alkylic protons). The areas are about 1:2 and show protonation is occurring mainly on a carbon already possessing a proton.

EXAMPLE VI

A solution of 179 parts of potassium 1,2,3-tricyanocyclopentadienide in 2500 parts of water is treated with 468 parts of bromine and the mixture is stirred at room temperature for 10 minutes. The precipitate which forms, 272 parts, is collected and dissolved in about 2180 parts of 10% aqueous potassium hydroxide. After 30 minutes about 100 parts of potassium 1,2-dibromo-3,4,5-tricyanocyclopentadienide crystallizes. An analytical sample is prepared by recrystallization from potassium chloride-water.

IR $\lambda_{max.}^{Nujol}$ 3500, 2220, 1620, 1350, 1140, and 1050 cm.$^{-1}$

*Analysis.*—Calcd. for C$_8$N$_3$Br$_2$K: C, 28.5; N, 12.5. Found: C, 28.1; N, 11.7.

EXAMPLE VII

Potassium 1,2,3-tricyanocyclopentadienide, 100 parts, is dissolved in 2840 parts of concentrated nitric acid and allowed to stand at room temperature 15 minutes.

The dark solution is poured into 10,000 parts of ice-water containing 200 parts of tetraethylammonium chloride. Tetraethylammonium 1,2,3 - tricyano-4,5-dinitrocyclopentadienide (112 parts, 55% yield) is collected on a filter and dried. Colored impurities are removed by boiling 5000 parts of water containing 200 parts of KCN. The light yellow purified product (68 parts) is then recrystallized three times from 1:2 acetonitrile water. This final product does not melt but decomposes at ~346° C.

IR $\lambda_{max.}^{Nujol}$ 4.49, 6.60, 7.55, 11.20, 12.34, 13.30 and 13.50$\mu$ (Et$_4$N$^+$ bands not given)

U.V. $\lambda_{max.}^{CH_3CN}$ 680 m$\mu$ ($\epsilon$ 5.54), 358 m$\mu$ ($\epsilon$ 6,100), 270 m$\mu$ ($\epsilon$ 10,520) and 248 m$\mu$ ($\epsilon$ 13,000)

*Analysis.*—Calcd. for $C_{16}H_{20}N_6O_4$: C, 53.3; H, 5.59; N, 23.3. Found: C, 53.5; H, 5.63; N, 23.6.

EXAMPLE VIII

A solution of 100 parts of potassium 1,2,4-tricyanocyclopentadienide in 2840 parts of concentrmated nitric acid is allowed to stand at room temperature 15 minutes. The dark solution is then poured into 10,000 parts of ice-water containing 200 parts of tetraethylammonium chloride. Tetraethylammonium 1,2,4-tricyano-3,5-dinitrocyclopentadienide (144 parts, 72% yield) is collected on a filter and dried. Colored impurities are removed by boiling in 10,000 parts water containing 200 parts KCN. The purified product 103 parts, decomposes at 385° C. An analytical sample is prepared by recrystallization three times from 3:2 water acetonitrile.

IR $\lambda_{max.}^{Nujol}$ 4.49, 6.49, 7.52, 11.20, 12.51, 13.05 and 14.46$\mu$ (Et$_4$N$^+$ bands not given)

U.V. $\lambda_{max.}^{CH_3CN}$ 358 m$\mu$ ($\epsilon$ 7,520) and 303 m$\mu$ ($\epsilon$ 17,400)

*Analysis.*—Calcd. for $C_{16}H_{20}N_6O_4$: C, 53.3; H, 5.59; N, 23.3. Found: C, 53,1; H, 5.68; N, 23.1.

EXAMPLE IX

Cyanogen chloride (319 parts) is condensed into a solution of 100 parts of dry potassium 1,2,3-tricyanocyclopentadienide and 49 parts of aluminum trichloride in 3914 parts of acetonitrile at 0° C. The solution is stirred overnight at room temperature and then concentrated to dryness. The residue is dissolved in hot water and 200 parts of tetraethylammonium chloride is added. Tetraethylammonium tetracyanocyclopentadienide, 100 parts (60% yield), M.P. 125–130° C., is collected on a filter and dried. It is identified by its infrared spectrum.

EXAMPLE X

Into a suspension of 100 parts of potassium 1,2,4-tricyanocyclopentadienide in 1957 parts of dry acetonitrile at 0° C. is condensed 319 parts of cyanogen chloride. Aluminum trichloride (34 parts) is added and the mixture stirred at room temperature 24 hours. The resulting dark solution is concentrated to dryness and the residue dissolved in 10,000 parts of hot water. Tetraethylammonium chloride (200 parts) is added and the warm solution filtered. Tetraethylammonium tetracyanocyclopentadienide, 82 parts (50% yield), remains on the filter. The identity of the product is confirmed by its infrared spectrum.

When the procedures of Examples IX and X are followed but the time is extended to three days, four parts of tetraethylammonium pentacyanocyclopentadienide is isolated by fractional crystallization from methanol.

Example XI

Part A

A suspension of 300 parts of sodium hydrideminerial oil dispersion (53.5% NaH) in 1309 parts of 1,2-dimethoxyethane is cooled to 0° C. and 162 parts of methylcyclopentadiene is added in small portions over three hours. About 4.4 parts of hydrogen evolves. Then 250 parts of cyanogen chloride is condensed into the system at 0°–20° C. over an 8-hour period. About 8.1 parts of hydrogen evolves. An n-m-r spectrum shows that the solution contains sodium 1,3-dicyano-2-methylcyclopentadienide (absorption at 4.11$\tau$) and sodium 1,2-dicyano-3-methylcyclopentadienide (absorption at 3.84, 3.91, 4.46, 4.52$\tau$).

Part B

The procedure of Part A is repeated and the 1,3-dicyano-2-methylcyclopentadienide is isolated as its potassium salt by concentration of the reaction mixture to dryness under reduced pressure and chromatography of the residue on acid alumina, activity I, with ethyl acetate wash. The first band off the column is stirred with potassium carbonate in acetonitrile and the solution is filtered and the filtrate concentrated to dryness. The n-m-r spectrum of the product in acetonitrile (TMSi internal standard) shows a peak at 4.18$\tau$. An analytical sample, M.P. 219–221° C., is prepared by dissolving the sample in acetonitrile and precipitating with ether three times. The position of the hydrogen out of plane bending vibration in the infrared (13.95$\mu$) rules out 1,2-dicyano-4 - methylcyclopentadienide as the structure of the anion.

*Analysis.*—Calcd. for $C_8H_5N_2K$: C, 57.1; H, 3.00; N, 16.7. Found: C, 57.1; H, 3.54; N, 17.3.

EXAMPLE XII

To the reaction product of Part A of Example XI is added 250 parts of sodium fluoride powder and an additional 184 parts of cyanogen chloride is condensed into the reaction mixture over four hours. About 2.2 parts of hydrogen evolves. The mixture is stirred overnight at room temperature. An n-m-r spectrum of the reaction solution shows that the product contains the two tricyanomethylcyclopentadienide isomers (absorption at 3.53$\tau$ and 4.00$\tau$). The reaction mixture is filtered and the filtrate concentrated to dryness under reduced pressure. The residue is taken up in 1500 parts of water and washed with toluene to remove nonionic material. The water layer is treated with 450 parts of potassium chloride and the potassium tricyanomethylcyclopentadienide, which separates, is taken up in ethyl acetate and dried over calcium chloride. The water layer is also extracted with ethyl acetate and the extract combined with the other ethyl acetate solution. Concentration of the combined ethyl acetate solution to dryness yields 242 parts of potassium tricyanomethylcyclopentadienide. One of the two possible potassium tricyanomethylcyclopentadienide isomers is isolated by dilution of a concentrated acetonitrile solution of the mixed isomers with an equal amount of ether. The isomer which crystallizes is chromatographed on neutral alumina with acetonitrile wash, and recrystallized three times from water. It melts at 285–287° C.

n-m-r $\lambda_{TMSi\ Int.}^{CH_3CN}$ single peak at 3.43$\tau$ (methyl group obscured by solvent)

IR $\lambda_{max.}^{CH_3CN}$ 3.50, 4.55, 8.74, 8.92, 11.25, 11.43, 12.56

*Analysis.*—Calcd. for $C_9H_4N_3K$: C, 56.0; H, 2.90; N, 21.7. Found: C, 55.9; H, 2.30; N, 21.7.

EXAMPLE XIII

A solution of 236 parts of the mixed isomers of potassium tricyanomethylcyclopentadienide in 1174 parts of acetonitrile is dried by passing through a column of alumina. The dried solution is cooled to 0° C. and 87 parts of aluminum trichloride is added in 15 part portions. One hundred fifteen parts of cyanogen chloride is then condensed into the system over the course of three hours. The solution is stirred at room temperature for two days. The mixture is then concentrated to dryness under reduced pressure and the residue extracted with 1000 parts of water. Potassium chloride, 300 parts, is dissolved in the extract and the potassium methyltetracyanocyclopentadienide which precipitates, 54 parts, is collected and dried. An analytical sample, M.P. 333–334° C., is prepared by chromatography on neutral alumina with acetonitrile wash, followed by recrystallization from dioxane.

IR $\lambda_{max.}^{KBr}$ 2.75, 2.85, 4.50, 6.1, 6.85, 7.13$\mu$

U.V. $\lambda_{max.}^{CH_3CN}$ 303 m$\mu$ ($\epsilon$ 13,870), 293 m$\mu$ ($\epsilon$ 13,820) 246 m$\mu$ ($\epsilon$ 48,000), 238 m$\mu$ ($\epsilon$ 40,600)

*Analysis.*—Calcd. for $C_{10}H_3N_4K$: C, 55.0; H, 1.39; N, 25.7. Found: C, 55.0; H, 1.51; N, 25.7.

EXAMPLE XIV

Part A

A mixture of 67 parts of sodium hydride-mineral oil dispersion (53.5% NaH), 100 parts of powdered sodium fluoride, and 437 parts of 1,2-dimethoxyethane is stirred and 32.2 parts of cyclopentadiene is added at room temperature under nitrogen over a three hour period. Hydrogen, about one part, evolves. The mixture is cooled to 0° C. and 47.1 parts of methyl chloroformate is added in small portions over the course of two hours. An n-m-r spectrum of the soluble portion of the mixture shows that sodium methoxycarbonylcyclopentadienide is the major product present in the solvent. ($A_2B_2$ pattern centered at 4.05$\tau$ with a separation of 38 cps. between the two most intense peaks.) The reaction mixture is cooled to 0° C. and 31 parts of cyanogen chloride is introduced as a vapor over 1.5 hours. Hydrogen, about 1.13 parts, evolves. An n-m-r spectrum of the soluble portion of the reaction mixture shows that its major constituents are the two possible monocyanated methoxycarbonylcyclopentadienides. The 2-cyano isomer gives an ABC pattern with four peaks centered at 3.56$\tau$, four at 3.72$\tau$, and a triplet at 4.36$\tau$. $J_{BC}=J_{AB}=3.5$ cps. $J_{AC}=2.0$ cps. The 3-cyano product (present in lesser abundance) gives a triplet with J=2 at 3.22$\tau$ assigned to the hydrogen between the two substituents. Based on the two triplet intensities, the ratio of 2-substituted product to 3-substituted product is about 6:1.

Part B

An additional 49 parts of cyanogen chloride is added to the reaction mixture from Part A over a three hour period at 0° C. The resulting suspension is heated at 50–60° C. for three hours. The n-m-r spectrum of the soluble portion of the reaction mixture contains peaks in the 3.2$\tau$ region assigned to the 3,4-dicyano-1-methoxycarbonyl isomer and the 2,4-dicyano-1-methoxycarbonyl isomer as well as an AB pattern with J=4 centered at 3.76$\tau$ with a separation of 21 cps. between the weak peaks and 13 cps. between the strong, assigned to 2,3-dicyano-1-methoxycarbonylcyclopentadienide and a single peak at 3.80$\tau$ assigned to 2,5-dicyano-1-methoxycarbonylcyclopentadienide.

Part C

The reaction mixture from Part B is filtered and the filtrate concentrated to dryness. The residue is taken up in 300 parts of water and extracted with toluene to remove mineral oil. The water layer is then boiled until the boiling point of the vapor reaches 100° C. Ninety parts of potassium chloride is added and the mixture is extracted with ethyl acetate. Concentration of the extract leaves 37 parts of mixed dicyano isomers. The mixture is dissolved in 235 parts of acetonitrile and passed through neutral alumina to dry. The dry solution is stirred with 23 parts of aluminum trichloride and 22 parts of cyanogen chloride overnight at room temperature. The mixture is concentrated to dryness and the residue extracted with 300 parts of water. The extract is treated with 40 parts of tetraethylammonium chloride and the precipitate of tetraethylammonium methoxycarbonyltetracyanocyclopentadienide, 8.3 parts, which forms is collected and dried. An analytical sample is prepared by recrystallization from water and ethylene chloride.

IR $\lambda_{max.}^{KBr}$ 4.51, 5.85, 7.90, and 8.96$\mu$ ($Et_4N^+$ bands not given)

*Analysis.*—Calcd. for $C_{19}H_{23}N_5O_2$: C, 64.6; H, 6.56; N, 19.8. Found: C, 65.9; H, 6.60; N, 21.0.

Part D

One part of the ester formed in Part C is boiled in 50 parts of water containing 3 parts of potassium carbonate for five minutes. The solution is cooled and filtered. On acidification with 6 N hydrogen chloride, 0.3 part of tetraethylammonium carboxytetracyanocyclopentadienide crystallizes, M.P. 259–263° C., mixed with authentic sample, M.P. 262–266° C. The infrared spectrum of the product further confirms its identity.

EXAMPLE XV

Part A

Potassium 1,2,4-tricyanocyclopentadienide (2 parts) is stirred in 2.18 parts of 30% aqueous formaldehyde at room temperature. Trifluoroacetic acid (46 parts) is slowly added over a period of one-half hour. An insoluble polymer precipitates. The polymer is washed with water and dried.

Part B

The 1,2,4-tricyanocyclopentadiene-formaldehyde copolymer is shown to be an ion-exchange resin as follows: The product from Part A above is placed in an ion-exchange column. The column is saturated with $Ca^{++}$ ion by washing with aqueous calcium chloride solution. The column is then washed with water until the washing gives no precipitate with sodium oxalate solution. The $Ca^{++}$ ion is then eluted from the column by washing with aqueous potassium chloride solution. The eluate gives a positive test for $Ca^{++}$ ion with sodium oxalate solution.

EXAMPLE XVI

Potassium 1,2,3-tricyanocyclopentadienide (2 parts) is stirred in 2.18 parts of 30% aqueous formaldehyde at room temperature. Trifluoroacetic acid (46 parts) and concentrated sulfuric acid (9.2 parts) are added slowly over a period of about one-half hour. A reddish 1,2,3-tricyanocyclopentadiene-formaldehyde copolymer precipitates and is recovered as shown in Part A of Example XV.

EXAMPLE XVII

The procedure of Part A of Example XV is repeated with the exception that trimethylammonium 1,2-dicyanocyclopentadienide is substituted for the potassium 1,2,4-tricyanocyclopentadienide. A 1,2-dicyanocyclopentadiene-formaldehyde copolymer precipitate is obtained.

EXAMPLE XVIII

A solution prepared from 326 parts of tetrapropylammonium 1,2,4-tricyanocyclopentadienide, 520 parts of a 5.8% aqueous solution of formaldehyde, 767 parts of trifluoroacetic acid and 2348 parts of acetonitrile is stirred at room temperature for one hour. The resulting viscous red solution is poured into ethyl acetate and the rubbery polymer which separates is dissolved in acetonitrile and reprecipitated several times. The dry purified formaldehyde tetra-n-propylammonium-1,2,4-tricyanocyclopentadienide condensation polymer is black and no longer rubbery. Its inherent viscosity (0.25% solution in $CH_3CN$ at 25°) is 1.74.

*Analysis.*—Calcd. for $C_{21}H_{20}N_4$: C, 74.6; H, 8.95; N, 16.6. Found: C, 74.7; N, 8.73; N, 17.3.

$\lambda_{max}^{KBr}$ 3.36, 3.47, 4.58, 6.38, 6.80, 7.25, 7.40, 7.78, 8.50, 10.34, and 13.20μ.

$\lambda_{max}^{CH_3CN}$ 582 (3.96), 328 (2.00), 293 (38.1), 282 (41.2), and 244 mμ (k=99.0)

EXAMPLE XIX

A sheet of porous paper *a* is dusted on one surface with powdered tetramethylammonium 1,2-dicyanocyclopentadienide. Another sheet of porous paper *b* is dusted on one surface with powdered tetracyanoethylene (a pi acid). Sheets *a* and *b* are laid with their dusted surfaces in contact and a metal stylus is used to write on the assembly. The writing appears immediately as dark yellow marks on both the dusted surfaces. When tetramethylammonium 1,2,3-tricyanocyclopentadienide is used in place of tetramethylammonium 1,2-dicyanocyclopentadienide in this procedure, the writing appears as purple marks.

EXAMPLE XX

Part A

A solution of 100 parts of potassium tetracyanocyclopentadienide in 2840 parts of concentrated nitric acid is allowed to stand at room temperature 15 minutes. The resulting dark solution is poured into 10,000 parts of ice-water containing 200 parts of tetraethylammonium chloride. Tetraethylammonium nitrotetracyanocyclopentadienide, 112 parts (67% yield), M.P. 372–374° C., is collected on a filter and dried. The product is identified by its infrared spectrum.

Part B

A suspension of 73 parts of tetraethylammonium nitrotetracyanocyclopentadienide and 100 parts of zinc powder in 7500 parts of water is treated with 555 parts of 6 N hydrogen chloride. Upon heating under reflux 15 minutes the salt dissolves. The hot solution is filtered and the crystals which form as the filtrate cools are collected and stirred with 100 parts of sodium bicarbonate in 3914 parts of acetonitrile at room temperature for 15 minutes. The excess sodium bicarbonate is separated by filtration and the filtrate concentrated to dryness. There remains 35 parts (57% yield) of tetraethylammonium aminotetracyanocyclopentadienide. After one recrystallization from water, the product weighs 14 parts and melts at 126–126.5° C. It is identified by its infrared absorption spectrum.

EXAMPLE XXI

A solution of 20 parts of potassium, 1,2-dibromo-3,4,5-tricyanocyclopentadienide, 20 parts of paraformaldehyde and 20 parts of water in 366 parts of concentrated sulfuric acid is warmed to 80° C. for 10 minutes. The warm solution is then poured onto cracked ice. The polymer which separates is collected on a filter and dried to obtain 10 parts of tough, semi-elastic granules. The infrared absorption spectrum shows that all the nitrile groups have been converted to amide groups. The product is an ion-exchange resin.

When isopropylcyclopentadiene is substituted for methylcyclopentadiene in the procedures of Examples XI and XII, there are successively obtained sodium 1,3-dicyano-2-isopropylcyclopentadienide and potassium isopropyltricyanocyclopentadienide.

The scope of the alkyl and alkoxy terms in the definition of $R_2$ is shown as follows:

When the alkylcyclopentadienes indicated in Table I are substituted for methylcyclopentadiene in Part A of Example XI, the indicated alkylcyclopentadienide salts are obtained. These salts can be isolated as their corresponding potassium salts by the procedure of Part B of Example XI and can be converted to the analogous tricyanocyclopentadienides by the procedure of Example XII. The latter compounds are also shown in Table I.

When the alkyl chloroformates indicated in Table II are substituted for methyl chloroformate in Part A of Example XIV and the several procedures of Parts A, B, and C of Example XIV are otherwise carried out, the indicated alkoxycarbonylcyclopentadienide salts are obtained.

TABLE I

| Alkylcyclopentadiene | Alkylcyclopentadienide Salts Obtained |
|---|---|
| Ethylcyclopentadiene | Sodium 1,3-dicyano-2-ethylcyclopentadienide. |
| | Sodium 1,2-dicyano-3-ethylcyclopentadienide. |
| | Potassium 1,2-dicyano-2-ethylcyclopentadienide. |
| | Potassium ethyltricyanocyclopentadienide. |
| Octylcyclopentadiene | Sodium 1,3-dicyano-2-octylcyclopentadienide. |
| | Sodium 1,2-dicyano-3-octylcyclopentadienide. |
| | Potassium 1,3-dicyano-2-octylcyclopentadienide. |
| | Potassium octyltricyanocyclopentadienide. |
| Octadecylcyclopentadiene | Sodium 1,3-dicyano-2-octadecylcyclopentadienide. |
| | Sodium 1,2-dicyano-3-octadecylcyclopentadienide. |
| | Potassium 1,3-dicyano-2-octadecylcyclopentadienide. |
| | Potassium octadecyltricyanocyclopentadienide. |

TABLE II

| Alkyl Chloroformate | Alkoxycarbonylcyanocyclopentadienide Salts Obtained |
|---|---|
| Ethyl chloroformate | Sodium 2,3-dicyano-1-ethoxycarbonylcyclopentadienide. |
| | Sodium 2,5-dicyano-1-ethoxycarbonylcyclopentadienide. |
| | Sodium 2,4-dicyano-1-ethoxycarbonylcyclopentadienide. |
| | Sodium 3,4-dicyano-1-ethoxycarbonylcyclopentadienide. |
| | Tetraethylammonium ethoxycarbonyltetracyanocyclopentadienide. |
| Octyl chloroformate | Sodium 2,3-dicyano-1-octyloxycarbonylcyclopentadienide. |
| | Sodium 2,5-dicyano-1-octyloxycarbonylcyclopentadienide. |
| | Sodium 2,4-dicyano-1-octyloxycarbonylcyclopentadienide. |
| | Sodium 3,4-dicyano-1-octyloxycarbonylcyclopentadienide. |
| | Tetraethylammonium octyloxycarbonyltetracyanocyclopentadienide. |
| Octadecyl chloroformate | Sodium 2,3-dicyano-1-octadecyloxycarbonylcyclopentadienide. |
| | Sodium 2,5-dicyano-1-octadecyloxycarbonylcyclopentadienide. |
| | Sodium 2,4-dicyano-1-octadecyloxycarbonylcyclopentadienide. |
| | Sodium 3,4-dicyano-1-octadecyloxycarbonylcyclopentadienide. |
| | Tetraethylammonium octadecyloxycarbonyltetracyanocyclopentadienide. |

As indicated and illustrated heretofore, the compounds of Formula I are readily converted to the salts of Formula II. All the salts of Formula II are pi bases. They react with pi acids to form deeply colored complexes. The formation of these complexes is useful in copying devices as demonstrated above in Example XIX.

All products of this invention designated by Formulas I and II copolymerize with formaldehyde to yield ion-exchange resins. The 1,3-hydrogen compounds copolymerize with formaldehyde under the above described conditions to yield cyano-containing ion-exchange resins represented by Formula III. The other compounds of Formulas I and II copolymerize with formaldehyde in the presence of strong sulfuric acid to yield ion-exchange resins wherein chain linkage is through amide groups and all cyano groups are hydrolyzed to amide groups. This polymerization reaction and resultant product have been illustrated above in Example XXI.

The di- and tricyanocyclopentadiene compounds of this invention display outstanding and unexpected properties when contrasted with known monocyano analogs and when contrasted with the tetra- and pentacyano analogs of my copending application Ser. No. 255,068. For example, the salts of the di- and tricyanocyclopentadienes disclosed and claimed herein have been found to be stable in air for long periods of time. No evidence of dimerization, decomposition, or other type of reaction has been noted upon standing under normal atmospheric conditions. On the other hand, analogous monocyano compounds are known to dimerize rapidly and their salts decompose upon exposure to air.

In regard to the related tetra- and pentacyano compounds, formation of strongly colored pi complexes by reaction with pi acids does not take place. In contrast, the di- and tricyano compounds of this invention form colored complexes which are very useful, in turn, in copying devices of various types. Clearly, the tetra- and pentacyano compounds cannot be so used.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Cyanocyclopentadiene compounds having from two to three cyano groups per cyclopentadiene ring and having the formula

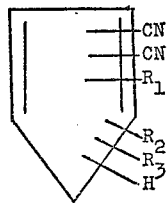

wherein $R_1$ is a member of the class consisting of hydrogen, halogen of atomic number 17–35 inclusive, nitro and cyano, $R_2$ is a member of the class consisting of hydrogen, halogen of atomic number 17–35 inclusive, nitro, amino, alkyl of 1–18 carbon atoms, alkoxycarbonyl wherein the alkoxy portion contains 1–18 carbon atoms and carboxy, and $R_3$ is a member of the class consisting of hydrogen, halogen of atomic number 17–35 inclusive and nitro, said compounds having each ring carbon bonded to not more than one CN, $R_1$, $R_2$ or $R_3$ group other than hydrogen; and salts thereof having the formula

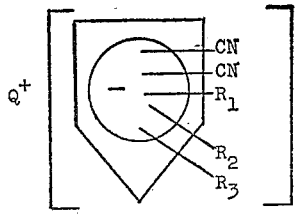

wherein $R_1$, $R_2$ and $R_3$ are defined as above where each ring carbon is bonded to not more than one CN, $R_1$, $R_2$ or $R_3$ group and Q represents one equivalent of a cation selected from the class consisting of hydrogen ion, metal ions, unsubstituted ammonium ion and $C_1$–$C_{18}$ alkyl-substituted ammonium ions.

2. A compound of the formula

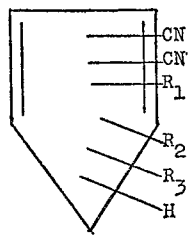

wherein $R_1$ is a member of the class consisting of hydrogen, halogen of atomic number 17–35 inclusive, nitro and cyano, $R_2$ is a member of the class consisting of hydrogen, halogen of atomic number 17–35 inclusive, nitro, amino, alkyl of 1–8 carbon atoms, alkoxycarbonyl wherein the alkoxy portion contains 1–8 carbon atoms and carboxy, and $R_3$ is a member of the class consisting of hydrogen, halogen of atomic number 17–35 inclusive and nitro, said compound having each ring carbon bonded to not more than one CN, $R_1$, $R_2$ or $R_3$ group other than hydrogen.

3. A compound of the formula

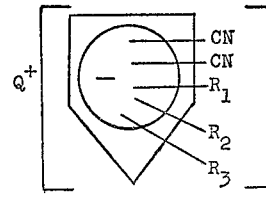

wherein $R_1$ is a member of the class consisting of hydrogen, halogen of atomic number 17–35 inclusive, nitro and cyano, $R_2$ is a member of the class consisting of hydrogen, halogen of atomic number 17–35 inclusive, nitro, amino, alkyl of 1–8 carbon atoms, alkoxycarbonyl wherein the alkoxy portion contain 1–8 carbon atoms and carboxy, and $R_3$ is a member of the class consisting of hydrogen, halogen of atomic number 17–35 inclusive and nitro where each ring carbon is bonded to not more than one CN, $R_1$, $R_2$ or $R_3$ group, and Q represents one equivalent of a cation selected from the class consisting of hydrogen ion, metal ions, unsubstituted ammonium ion and $C_1$–$C_8$ alkyl-substituted ammonium ions.

4. A dicyanocyclopentadiene compound selected from the group consisting of 1,2-dicyanocyclopentadiene and 1,3-dicyanocyclopentadiene.

5. A metal salt of a compound of claim 4.

6. A sodium salt of a compound of claim 4.

7. A lower alkyl-substituted ammonium salt of a compound of claim 4.

8. A tricyanocyclopentadiene compound selected from the group consisting of 1,2,3-tricyanocyclopentadiene and 1,2,4-tricyanocyclopentadiene.

9. A metal salt of a compound of claim 8.

10. A sodium salt of a compound of claim 8.

11. A lower alkyl-substituted ammonium salt of a compound of claim 8.

12. Tetramethylammonium 1,2-dicyanocyclopentadienide.

13. Process for preparing mono-, di-, and tricyanocyclopentadiene compounds which comprises contacting and reacting, at a temperature in the range from $-80°$ C. to $+100°$ C. and in the presence of sodium hydride, a cyclopentadiene compound of the formula

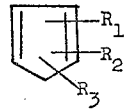

wherein $R_1$, $R_2$ and $R_3$ are as defined in claim 1 with cyanogen chloride.

14. Process which comprises contacting and reacting, at a temperature in the range from $-80°$ C. to $+100°$ C. and in the presence of sodium hydride, a cyclopentadiene compound of the formula

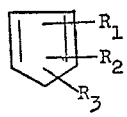

wherein $R_1$, $R_2$ and $R_3$ are as defined in claim 1 with cyanogen chloride to obtain a sodium cyanocyclopentadienide salt containing from two to three cyano substituents, treating said salt with an acidic ion-exchange resin, and recovering the resultant cyanocyclopentadiene acid.

15. Process which comprises contacting and reacting, at a temperature in the range from −80° C. to +100° C. and in the presence of sodium hydride, a cyclopentadiene with cyanogen chloride to obtain a tricyanocyclopentadiene compound of the formula

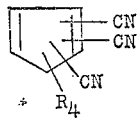

wherein $R_4$ is as defined in claim 17 reacting, at a temperature in the range from −20° C. to +100° C. and in the presence of aluminum chloride, said tricyanocyclopentadiene compound with cyanogen chloride, and recovering the resultant cyanocyclopentadiene compound bearing from four to five cyano substituents.

16. Process which comprises contacting and reacting, at a temperature in the range from −20° C. to +100° C. and in the presence of aluminum chloride, a tricyanocyclopentadiene compound of the formula

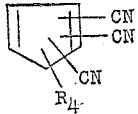

wherein $R_4$ is as defined in claim 17 with cyanogen chloride.

17. A copolymer of formaldehyde and a cyclopentadiene compound of claim 2, said copolymer having the recurring unit

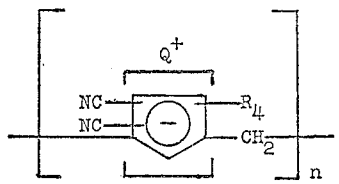

wherein:
Q is one equivalent of a cation selected from hydrogen ion, metal ions, unsubstituted ammonium ion or $C_1$–$C_{18}$ alkyl-substituted ammonium ions;
$R_4$ is hydrogen, halogen of atomic number 17–35, inclusive, nitro, cyano, alkyl of 1–18 carbons, alkoxy carbonyl wherein the alkoxy portion contains 1–18 carbon atoms and carboxy, said copolymer having each cyclopentadiene ring carbon bonded to not more than one CN, $R_4$ or —$CH_2$— group; and
$n$ is a cardinal number greater than five.

18. A copolymer of formaldehyde and a cyclopentadiene compound of claim 3, said copolymer having the recurring unit

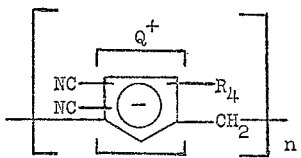

wherein:
Q is one equivalent of a cation selected from hydrogen ion, metal ions, unsubstituted ammonium ion or $C_1$–$C_{18}$ alkyl-substituted ammonium ions;
$R_4$ is hydrogen, halogen of atomic number 17–35, inclusive, nitro, cyano, alkyl of 1–18 carbons, alkoxy carbonyl wherein the alkoxy portion contains 1–18 carbon atoms and carboxy, said copolymer having each cyclopentadiene ring carbon bonded to not more than one CN, $R_4$, or —$CH_2$— group; and
$n$ is a cardinal number greater than five.

References Cited

Karrer et al., Helv. Chim. Acta, 2, 482–486 (1919); 3, 261–272 (1920).

Treibs, Berichte, 92, 606–615 (1959).

WILLIAM H. SHORT, *Primary Examiner.*

M. GOLDSTEIN, *Assistant Examiner.*